United States Patent
Ishii et al.

(10) Patent No.: US 6,434,132 B1
(45) Date of Patent: Aug. 13, 2002

(54) WIRELESS LAN FOR REESTABLISHING WIRELESS LINKS BETWEEN HOSTS ACCORDING TO MONITORED DESIRED AND UNDESIRED SIGNALS

(75) Inventors: Kenichi Ishii; Tomoki Osawa, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/023,744

(22) Filed: Feb. 13, 1998

(30) Foreign Application Priority Data

Feb. 13, 1997 (JP) .............................. 9-028678

(51) Int. Cl.⁷ ............................................... H04Q 7/24
(52) U.S. Cl. ....................................... 370/338; 370/445
(58) Field of Search ................................ 370/310, 335, 370/230, 245, 278, 311, 331, 337, 338, 349, 352, 401, 473; 455/62, 465, 63, 524, 437; 375/220; 345/349; 714/25

(56) References Cited

U.S. PATENT DOCUMENTS

| | | | | |
|---|---|---|---|---|
| 5,239,673 A | * | 8/1993 | Natarajan | 455/33.1 |
| 5,355,522 A | | 10/1994 | Demange | 455/62 |
| 5,442,633 A | * | 8/1995 | Perkins et al. | 370/331 |
| 5,627,829 A | * | 5/1997 | Gleeson et al. | 370/230 |
| 5,732,077 A | * | 3/1998 | Whitehead | 370/349 |

FOREIGN PATENT DOCUMENTS

| | | | |
|---|---|---|---|
| EP | 0490509 | 6/1992 | |
| EP | 0859490 A2 * | 8/1998 | H04L/12/28 |
| JP | 4-3535 | 1/1992 | |
| JP | 4-91522 | 3/1992 | |
| JP | 8-223110 | 8/1996 | |
| WO | 9526593 | 10/1995 | |

OTHER PUBLICATIONS

Kaname Arai et al.: "A Hybrid Indoor Data Network With Radio and Wire Performance Evaluation in a Rayleigh Channel," Proceedings of the Annual International Phoenix Conference and Computers and Communications, US, New York, IEEE, vol. Conf. 11, 1992, pp. 255–259, XP000310617 ISBN: 0-7803-0605-8, * p. 256, left–hand column, line 248 through p. 257, left–hand column, line 32*.

"Wireless LAN Medium Access Control (MAC) and Physical Layer (PHY) Specifications", P802.11D2.0, Jul. 28, 1995, Standarad IEEE 802.11.

Japanese Office Action dated Jun. 9, 1999 and an English–language translation of the relevant portions.

* cited by examiner

Primary Examiner—David Vincent
(74) Attorney, Agent, or Firm—Dickstein, Shapiro, Morin & Oshinsky, LLP.

(57) ABSTRACT

In a wireless local area network, each subnetwork is formed by a base host and several mobile hosts. The base host broadcasts a control packet at periodic intervals and the mobile hosts monitor the broadcast packet and interfering signals from other subnetworks. If any of the mobile hosts does not receive the control packet for a predetermined period or detects the interfering signal, it makes a search and selects a new channel. The parent host also monitors interfering signals from other subnetworks. If it detects an interfering signal, it selects a noiseless new channel. The channel number of the new channel may be broadcast using a channel assignment signal to allow the mobile hosts to select the new channel. Alternatively, no channel assignment signal is broadcast. In this case, it is up to the mobile hosts to select the new channel.

16 Claims, 2 Drawing Sheets

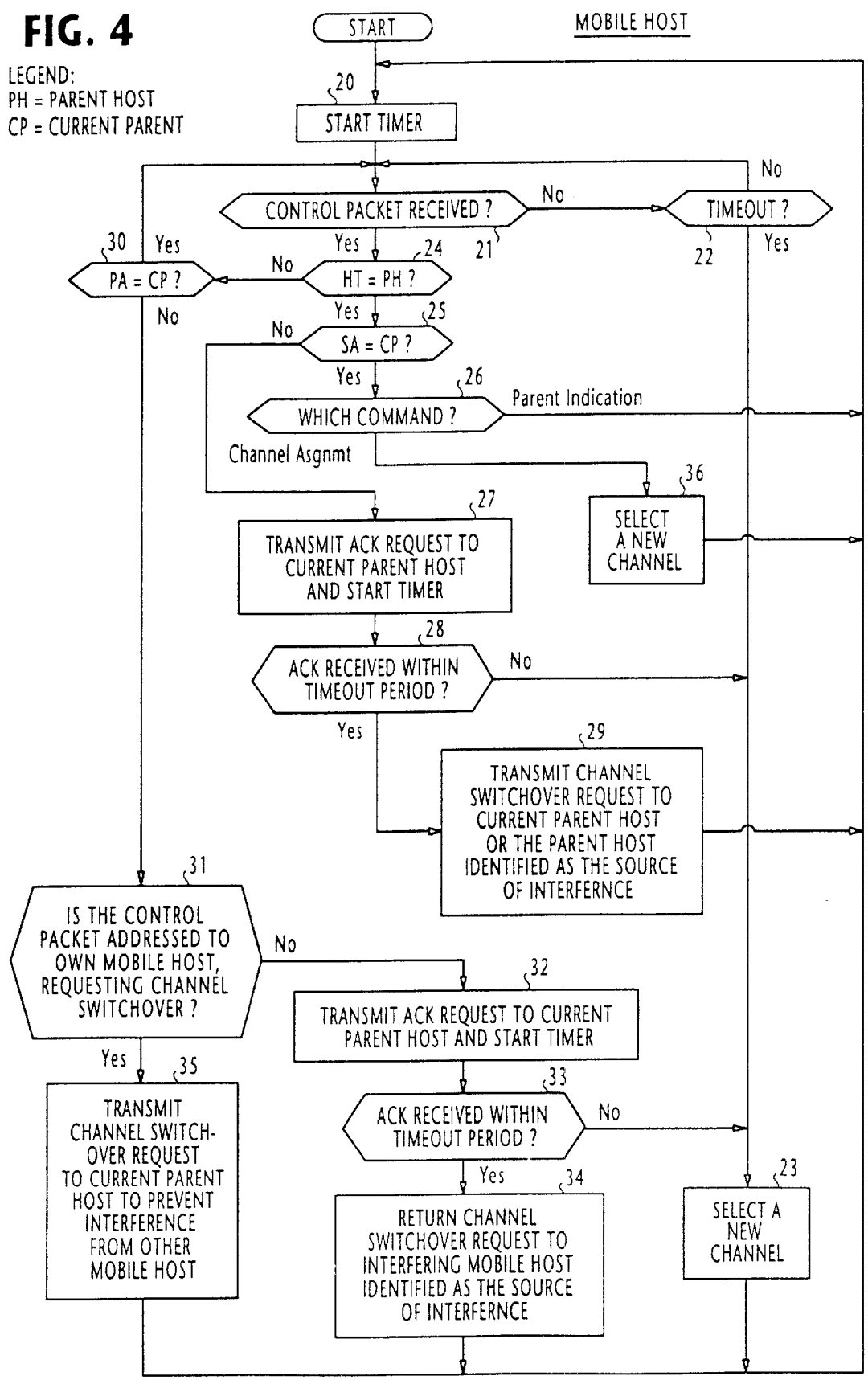

WIRELESS LAN FOR REESTABLISHING WIRELESS LINKS BETWEEN HOSTS ACCORDING TO MONITORED DESIRED AND UNDESIRED SIGNALS

BACKGROUND OF THE INVENTION

1. Field of the Invention

The present invention relates generally to a wireless local area network in which parent hosts and mobile hosts are organized into several subnetworks to establish wireless links by exchanging control packets, and more specifically to the avoidance of interruption of the links due to possible movement of the mobile hosts and of radio interference between subnetworks.

2. Description of the Related Art

In a known wireless local area network, as described in Draft Standard IEEE 802.11 "Wireless LAN Medium Access Control (MAC) and Physical Layer (PHY) Specifications" (P802.11 D2.0, Jul. 28, 1995), a plurality of mobile hosts and a plurality of base hosts are organized into a plurality of subnetworks so that each subnetwork consists of a single base host and several mobile hosts. Channels of different frequencies are permanently assigned to the subnetworks by taking into account their propagation environments and communication traffic. Within each subnetwork, the assigned channel is shared among its base host and its member mobile hosts. Each mobile host relies on user's manual assistance in order to set up the assigned channel. Overall reassignment of channels is often performed whenever there is a change in propagation environment and traffic. However, with possible movement of a mobile host from one subnetwork to another, the user must check for the channel number of the new subnetwork and alter the stored channel data before establishing a link with the base host of the new subnetwork. In addition, when a mobile host suffers from interference from an adjacent subnetwork, a time-consuming channel reassignment procedure will be required.

SUMMARY OF THE INVENTION

It is therefore an object of the present invention to provide a wireless local area network where the manual assistance for mobile hosts is eliminated and channels are automatically reassigned.

In a wireless local area network, a subnetwork is formed by a home base host and a home mobile host and a wireless link is established over a selected channel between the hosts. The home mobile host may receive an interfering signal from another subnetwork. According to the present invention, a control packet is broadcast from the home parent host at periodic intervals and the mobile host monitors the control packet and the interfering signal. If the mobile host does not receive the control packet for a predetermined period or detects the interfering signal, it makes a search for a new channel. The parent host also monitors interfering signals from other subnetworks. If it detects an interfering signal, it selects a new channel. The channel number of the new channel may be broadcast using a channel assignment signal to allow the home mobile hosts to select the new channel. Alternatively, no channel assignment signal is broadcast. In this case, it is up to the home mobile hosts to hunt for a new channel.

In a preferred form of this invention, the home mobile host is arranged to transmit an acknowledgment request from the home mobile host to the home parent host if it detects interference and identifies the parent host of another subnetwork as a source of interference, transmit a channel switchover request from the mobile host to the parent host if an acknowledgment response is returned within a predetermined interval. If the acknowledgment response is not returned within the predetermined interval, the mobile host makes a search for a new channel to reestablishes communication. The home mobile host is further arranged to transmit an acknowledgment request to the home parent host if it identifies the mobile host of another subnetwork as a source of interference. If an acknowledgment response is returned within a predetermined interval, the mobile host transmits a channel switchover signal to another subnetwork to cause it to switch over to a different channel. If the acknowledgment response is not returned within the predetermined interval, the mobile host makes a search and selects a new channel.

BRIEF DESCRIPTION OF THE DRAWINGS

The present invention will be described in further detail with reference to the accompanying drawings, in which:

FIG. 4 shows in flow diagram form the operation of a mobile host when a communication is established with a parent host.

DETAILED DESCRIPTION

Figure 1A:
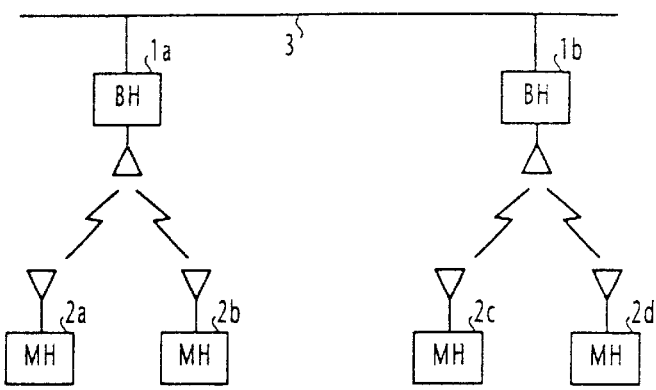
FIGS. 1A and 1B show in block diagram form wireless LAN subnetworks embodying the present invention.

In FIG. 1A, a wireless local area network of the present invention is shown as comprising base hosts 1 and mobile hosts 2. Base hosts 1a and 1b are connected to a common medium 3 and mobile hosts 2a, 2b form a first subnetwork with base host 1a and mobile hosts 2c, 2d form a second subnetwork with base host 1b. Each base host operates as a home parent host for broadcasting a signal to the communicating mobile hosts and performs channel management and control functions. The system is allocated a frequency spectrum which is divided into a number of communication channels and these channels are shared among the subnetworks.

Figure 1B:
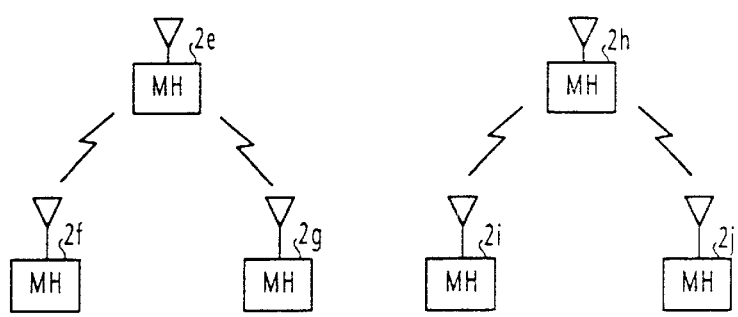

Interference may occur between adjacent subnetworks. As will be described in detail later, when the parent host of each subnetwork recognizes that it is being interfered with another subnetwork, it changes channels. In this case, the parent host broadcasts a channel assignment signal to command the mobile hosts to quickly switch to the new channel. Alternatively, no channel switchover signal is sent. In this case, each mobile host recognizes that it has lost contact with the current parent host and searches through the frequency spectrum and select a new channel. This automatically restores communication between the parent host and mobile hosts. When each mobile host recognizes that it is interfered with another subnetwork, it sends a channel switchover request to the parent host. In response, the parent host searches for a new channel free from interference and broadcasts the new channel number and requests the home mobile hosts to switch over to the new channel. The network may exclusively comprise mobile hosts which are organized to form a plurality of wireless IAN subnetworks as shown in FIG. 1B. In this case, one of the mobile hosts of each subnetwork serves as a parent host for the other mobile hosts.

As illustrated, mobile host 2c serves as a home parent host for mobile hosts 2f and 2g, and mobile host 2h serves a home parent host for mobile hosts 2i and 2j. It will be appreciated that the wireless local area network of this invention may be organized by the configuration of either FIG. 1A or 1B or a combination of both.

Figure 2:
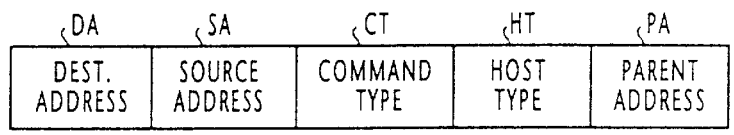
FIG. 2 shows the format of a control packet used in the present invention.

For purposes of ensuring continuity of established links within each subnetwork and between subnetworks and of avoiding interference between subnetworks, control packets of different command types are used in the network. As shown in FIG. 2, the control packet has a number of fields: DA, SA, CT, HT and PA. The DA and SA fields contain destination and source addresses respectively and the CT field contains information relating to the command type of the control packet. The command types include "parent indication" which announces the presence of a parent host, "channel switchover request", "channel assignment command", "acknowledgment request" and "acknowledgment response". The HT field is used to indicate whether the host is a base or a mobile. The PA field contains the address of a parent host with which a mobile host is currently in communication. If a control packet is a broadcast packet, the DA field contains an indication as such. The mobile hosts of each subnetwork may move around from one subnetwork to another and establish a link with a new parent host by exchanging such control packets.

Figure 3:
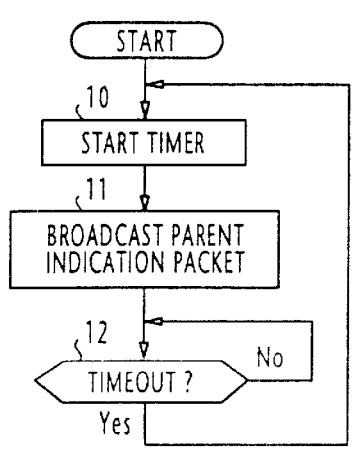
FIG. 3 shows in flow diagram form the operation of a parent host when it is periodically broadcasting a parent indication packet.

Once a wireless link is established between a parent host and one or more mobile hosts, the parent host broadcasts a parent indication control packet at predetermined intervals to announce its presence. As illustrated in FIG. 3, the parent host starts a timer (step 10) and then broadcasts a parent indication packet (step 11) and checks to see if the timer has timed out (step 12). If the timer has timed out, flow returns to step 10 to repeat the process.

Each mobile host communicating with a parent host operates according to the flowchart of FIG. 4. After starting a timer at step 20, the mobile host proceeds to step 21 to check for the reception of a control packet. If no control packet is received, flow proceeds to step 22 to check to see if the timer has timed out. If the decision is negative at step 22, flow returns to step 21. If the timer has timed out due to the absence of control packets for a period longer than the period of the timer, it is determined that the mobile host has lost contact with the parent host possibly due to its moving around, the flow proceeds from step 22 to step 23 where the mobile host makes a search through the frequency spectrum for a new channel to reestablishes the communication. If the loss of contact is due to the moving of the mobile host out of the range of a subnetwork, the new wireless link will be established with the parent host of another subnetwork. If the loss of contact is due to a sudden channel switching of the current parent host to avoid interference and no channel assignment signal is transmitted, the new wireless link is a reestablished link to the current parent host. Flow then returns to step 20. The process of selecting a new channel is described in detail in copending U.S. Pat. No. 08/908,979, Kenichi Ishii, filed Aug. 8, 1997, assigned to the same assignee as the present invention. Reference to this copending application is hereby incorporated.

If a control packet is received (step 21), flow proceeds to step 24 to examine the host-type field HT and determine whether it contains the address of a parent host (PH). If the control packet is from a parent host, a test is made at step 25 to determine whether the SA field contains the address of the current parent of the mobile host. If this is the case, flow proceeds from step 25 to step 26 to examine the CT field. If the control packet is a parent indication packet, flow returns to step 20 to restart the timer and if the packet is a channel assignment command, flow proceeds to step 36 to select a new channel according to the assignment command and then returns to step 20.

If the decision at step 25 is negative, it is determined that the control packet is from the parent host of other subnetwork. This indicates that interference has occurred. The mobile host then proceeds to step 27 to transmit an acknowledgment request to the current parent host and start a timer in order to ascertain that the wireless link to the current parent host is still maintained. The mobile host then proceeds to step 28 to check for the reception of a returning acknowledgment response within the timeout period of the timer.

If the acknowledgment response is returned from the current parent host within the period of the timer (step 28), the mobile host, determining that an interference has occurred, proceeds to step 29 to transmit a channel switchover request to the current parent host to avoid the interference. Flow then returns to the starting point of the routine. Alternatively, the channel switchover signal is transmitted to the parent host which is identified as the source of interference. If no acknowledgment response is received before the timer runs out, the mobile host determines that it has lost contact with the current parent host. Flow proceeds from step 28 to step 23 to select a new channel.

If the decision at step 24 is negative, it is determined that the control packet received at step 21 is from a mobile host and flow proceeds to step 30 to examine the PA field of the packet. If the PA field contains the address of the current parent host, it is determined that the packet is from a mobile host of the same subnetwork and flow returns from step 30 to step 21. If the decision at step 30 is negative, the mobile host recognizes that the control packet is from a mobile host of another subnetwork and proceeds to decision step 31 to examine the DA and CT fields of the packet. The mobile host determines whether the packet is addressed to the own mobile host and is requesting a channel switchover. If the decision is negative at step 31, the mobile host determines that the mobile host of the other subnetwork is now interfering the own mobile host, and flow proceeds to step 32 to transmit an acknowledgment request to the current parent host and starts a timer in order to ascertain that the current wireless link is still maintained. The mobile host then proceeds to step 33 to check for the reception of a returning acknowledgment response within the timeout period of the timer.

If the acknowledgment response is returned form the current parent host within the period of the timer (step 33), the mobile host determines that an interference has occurred. In order to prevent this interference, flow proceeds from step 33 to step 34 where the mobile host transmits a channel switchover request to the mobile host which is identified as the source of interference. The mobile host identified as the source of the interference, in turn, sends a channel switchover request to its corresponding parent host. Flow then returns from step 34 to the starting point of the routine. If no acknowledgment response is received within the period of the timer (step 33), the mobile host determines that it has lost contact with the current parent host. Flow proceeds from step 33 to step 23 to select a new channel as described above.

If the decision at step 31 is affirmative, it indicates that the control packet is addressed to the own mobile host, requesting that the current channel be switched over. In this case, the mobile host determines that it is interfering the other mobile host from which the control packet was received, and proceeds to step 35 to transmit a channel switchover request to the current parent host in order to request it to switch over to an interference-free channel. Flow then returns from step 35 to the starting point of the routine.

Figure 5:
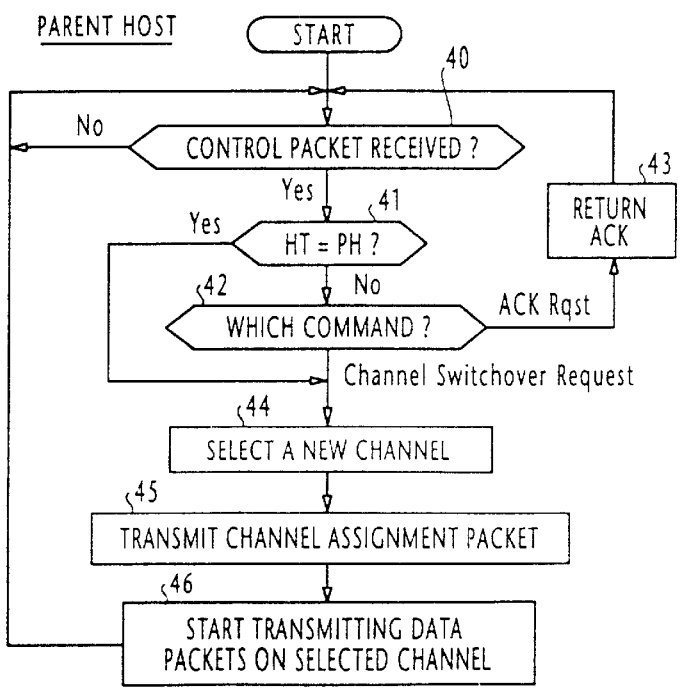
FIG. 5 shows in flow diagram form the operation of the parent host when a communication is established with a mobile host.

The parent host, either a base host or a mobile host, operates according to the flowchart of FIG. 5 in response to a control packet received from a mobile host. When a control packet is received (step 40), the parent host proceeds to step 41 to examine its HT field to determine if it contains the address of a parent host. IF the decision is negative, the parent host recognizes that the control packet is from a mobile host and proceeds to step 42 to examine the CT field to determine the type of command. If the packet is an acknowledgment request, flow proceeds from step 42 to step 43 to send an acknowledgment response to the requesting host, and returns to step 40. If the CT field indicates that the packet is a channel switchover request, flow proceeds to step 44 to select a new channel which is noiseless and free from interference, and broadcasts a channel assignment packet to inform its home mobile hosts of the new channel number (step 45). The parent host allows time for the mobile hosts to switch to the new channel and then starts transmitting data packets on the selected channel (step 46) and returns to step 40 to repeat the process. If the decision at step 41 is affirmative, the parent host determines that the control packet is from a parent host of other subnetwork, implying that an interference has occurred and that the current wireless link must be switched to a new channel. The parent host proceeds to step 44 to select a new channel and broadcasts the new channel number (step 45).

As an alternative embodiment, step 45 may be dispensed with. In this case, the home mobile hosts search for the new channel to which the current parent host has switched over. In FIG. 4, steps 26 and 36 are dispensed with, the flow is made to directly return from step 25 to step 20 when the decision at step 25 is affirmative.

What is claimed is:

1. In a wireless local area network comprising a plurality of subnetworks each including a parent host and a plurality of mobile hosts, wherein in each subnetwork a wireless link is established over a selected channel between at least one particular mobile host and a particular parent host and the particular mobile host may receive a signal from another subnetwork, a method for operating said local area network, comprising the steps of:

broadcasting a control packet at periodic intervals from said particular parent host of each subnetwork;

monitoring said control packet and said signal from said another subnetwork at said particular mobile host of each subnetwork;

monitoring said signal from said another subnetwork at said particular parent host;

selecting, at said particular mobile host, a new channel if said control packet is not received by said particular mobile host within a period of time or said signal from said another subnetwork is detected by said mobile host; and selecting, at said particular parent host, a new channel if said signal from said another subnetwork is detected by said particular parent host.

2. The method of claim 1, further comprising the steps of:
broadcasting a channel assignment signal indicating the new channel selected by said particular parent host; and
receiving, at said particular mobile host, said channel assignment signal and selecting a new channel according to said channel assignment signal.

3. The method of claim 1, wherein:
the step of broadcasting comprises the step of identifying a source of said signal from said another subnetwork at said particular mobile host; and wherein
the step of selecting, at said particular mobile host, comprises the step of:
transmitting a channel switchover request from said particular mobile host to said another subnetwork if it is determined at said particular mobile host that said signal from said another subnetwork is from a mobile host of said another subnetwork.

4. The method of claim 1, wherein:
said step of monitoring comprises the step of identifying a source of said signal from said another subnetwork at said particular mobile host; and
wherein said step of selecting, at said mobile host, comprises the steps of:
transmitting a channel switchover request from said particular mobile host to an interfering mobile host if it is determined, at said particular mobile host, that said interfering mobile host of said another subnetwork is identified as a source of interference; and
transmitting a channel switchover request from said interfering mobile host of said another subnetwork to the corresponding parent host thereof.

5. The method of claim 1, wherein:
the step of monitoring comprises the step if identifying a source of said signal from said another subnetwork at said particular mobile host and wherein
the step of selecting, at said particular mobile host, comprises the steps of:
transmitting an acknowledgment request from said particular mobile host to said particular parent host if it is determined, at said particular mobile host, that the parent host of said another subnetwork is identified as a source of interference;
transmitting a channel switchover request from said particular mobile host to said particular parent host or the parent host of the another subnetwork if an acknowledgment response is received by said particular mobile host within a time interval; and
selecting a new channel if the acknowledgment response is not received by the particular mobile host within the time interval.

6. The method of claim 1, wherein:
the step of monitoring comprises the step of identifying a source of said interfering signal at said particular mobile host; and
wherein the step of selecting, at said mobile host, comprises the steps of:
transmitting an acknowledgment request to said particular parent host of said particular mobile host if it is determined, at said particular mobile host, that an interfering mobile hot of said another subnetwork is identified as a source of interference;
transmitting a channel switchover signal to said interfering mobile host if an acknowledgment response is received by said particular mobile host within a time interval; and
selecting a new channel if said acknowledgment response is not received by said particular mobile host within the time interval.

7. The method of claim 1, further comprising the steps of:
- receiving, at said particular mobile host, a channel switchover request from the mobile host of said another subnetwork; and
- transmitting a channel switchover request to said particular parent host.

8. A wireless local area network comprising:
- a plurality of subnetworks each including a parent host and a plurality of mobile hosts, wherein in each subnetwork a wireless link is established over a selected channel between at least one particular mobile host and a particular parent host and said particular mobile host may receive a signal from another subnetwork;
- said particular parent host of each of said subnetworks broadcasting a control packet at periodic intervals over said selected channel, monitoring said signal from said another subnetwork, and selecting a new channel if said signal is detected; and
- said particular mobile host of each of said subnetworks monitoring said control packet and said signal from said another subnetwork, and selecting a new channel if said control packet is not received by said particular mobile host for a period of time or said signal from said another subnetwork is detected.

9. A wireless local area network as claimed in claim 8, wherein the parent hosts of said plurality of subnetworks are connected to a common transmission medium.

10. A wireless local area network as claimed in claim 8, wherein said particular parent host of each subnetwork is another mobile host which establishes said wireless link to said particular mobile host.

11. A wireless local area network as claimed in claim 8, wherein said particular parent host of each subnetwork is arranged to broadcast a channel assignment command signal indicating the selected new channel, and said particular mobile host of each subnetwork is arranged to receive said channel assignment command signal and select a new channel according to said channel assignment signal.

12. A wireless local area network as claimed in claim 8, wherein;
- said particular mobile host of each subnetwork identifies a source of said signal from said another subnetwork; and
- said particular mobile host transmits a channel switchover request to said another subnetwork if it is determined that said signal is from said another mobile host of said another subnetwork.

13. A wireless local area network as claimed in claim 12, wherein said particular mobile host is arranged to transmit said channel switchover request to said another mobile host of said another subnetwork.

14. A wireless local area network as claimed in claim 8, wherein:
- said particular mobile host of each subnetwork identifies a source of said interfering signal; and wherein:
  - if it is determined that the parent host of said another subnetwork is identified as a source of interference, said particular mobile host transmits an acknowledgment request to said particular parent host;
  - if an acknowledgment response is returned from said particular parent host within a time period, said particular mobile host transmits a channel switchover request to said particular parent host; and
  - if said acknowledgment response is not returned within the said time period, said particular mobile host selects a new channel.

15. A wireless local area network as claimed in claim 8, wherein:
- said particular mobile host identifies a source of said interfering signal; and
  - if it is determined that another mobile host of another subnetwork is identified as a source of interference, said particular mobile host transmits an acknowledgment request to said particular parent host of said particular mobile host;
  - if an acknowledgment response is returned from the particular parent host within a time period, said mobile host transmits a channel switchover request to said another subnetwork; and
  - if said acknowledgment response is not returned within said time period, said mobile host selects a new channel.

16. A wireless local area network as claimed in claim 15, wherein:
- said mobile host of each subnetwork is effective to transmit said channel switchover request to said another mobile host of said another subnetwork; and wherein
- said particular mobile host is effective to transmit a channel switchover request to the parent host of said another mobile host.

* * * * *